(No Model.) 2 Sheets—Sheet 2.

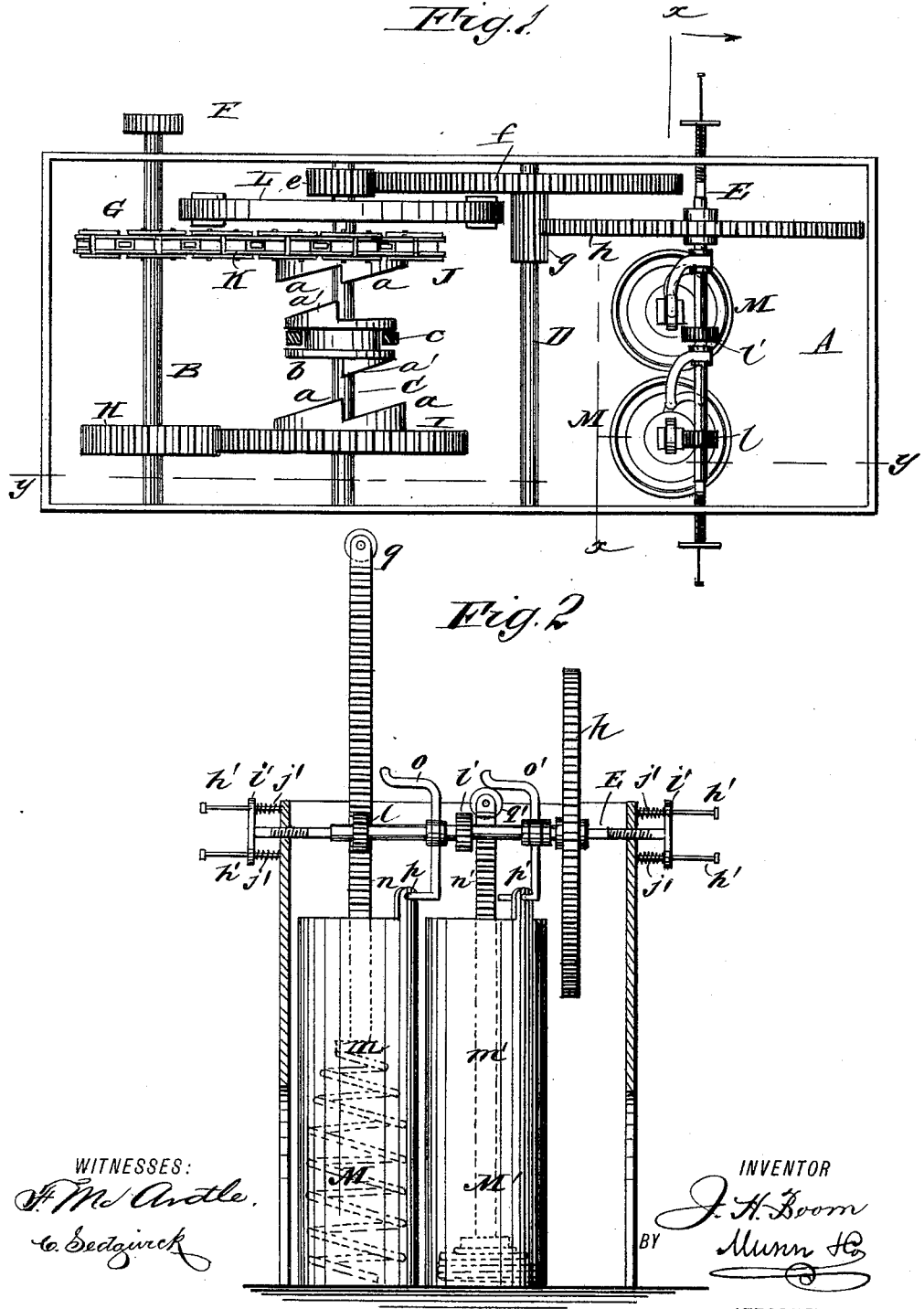

J. H. BOOM.
BRAKE AND STARTER FOR VEHICLES.

No. 415,440. Patented Nov. 19, 1889.

WITNESSES:
H. McArdle,
C. Sedgwick

INVENTOR
J. H. Boom
BY
Munn & Co
ATTORNEY

UNITED STATES PATENT OFFICE.

JOHN H. BOOM, OF WHITE LAKE, (DAKOTA TERRITORY,) SOUTH DAKOTA.

BRAKE AND STARTER FOR VEHICLES.

SPECIFICATION forming part of Letters Patent No. 415,440, dated November 19, 1889.

Application filed March 5, 1889. Serial No. 301,817. (No model.)

*To all whom it may concern:*

Be it known that I, JOHN H. BOOM, of White Lake, in the county of Aurora and Territory of Dakota, have invented a new and Improved Brake and Starter for Vehicles, of which the following is a specification, reference being had to the annexed drawings, forming a part thereof, in which—

Figure 3:
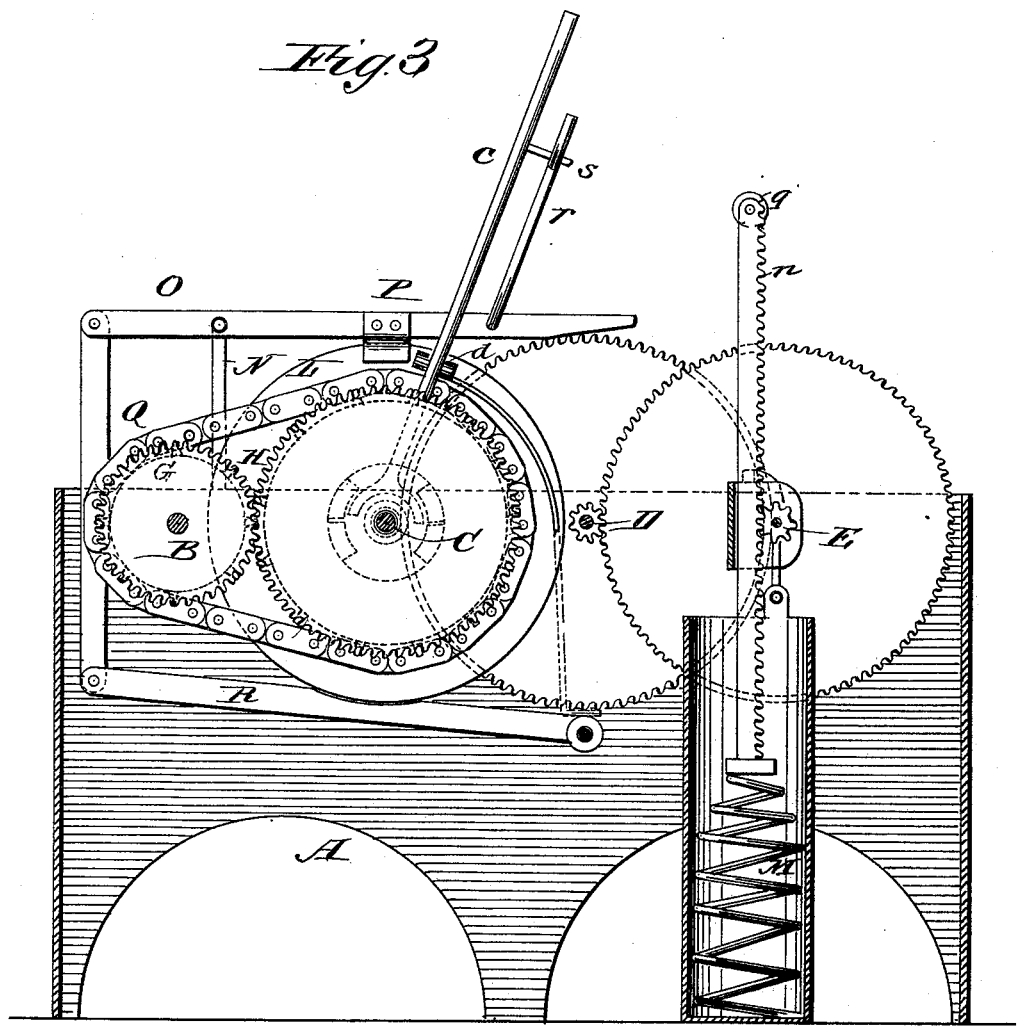
Figure 4:
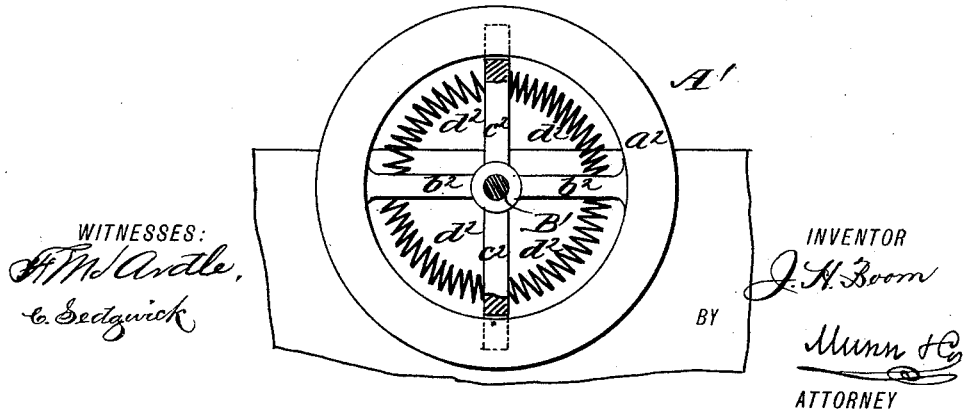

Figure 1 is a plan view of my improved brake and starter. Fig. 2 is a vertical transverse section taken on line $x\,x$ in Fig. 1. Fig. 3 is a vertical longitudinal section taken on line $y\,y$ in Fig. 1; and Fig. 4 is a detail side elevation, partly in section, of the fly-wheel.

Similar letters of reference indicate corresponding parts in all the views.

The object of my invention is to provide simple and effective mechanism for storing power during the descent of a vehicle on a downgrade, the power to be utilized in propelling the vehicle upon a level or an upgrade.

My invention consists in the combination, with the axle of a vehicle, of a shaft geared thereto and carrying a sprocket-wheel and a spur-wheel, a second shaft supporting a sprocket-wheel and a gear-wheel arranged to engage the wheels of the first shaft, a clutch mounted upon the second shaft between the sprocket-wheel and gear-wheel and arranged to turn with the shaft and engage either of the wheels, spring mechanism connected by gearing with the second shaft, and a clutch-lever and brake for controlling the movements of the mechanism.

The invention also further consists in devices for shifting the compressing mechanism from one set of springs to another, for compressing the springs in succession, and for re-engaging the springs when it is desired to utilize the power stored, all as will be hereinafter more fully described.

In the frame A are journaled the shafts B, C, D, and E. The shaft B is provided with the spur-wheel F outside of the frame A adapted to be engaged by a wheel of the shaft upon the vehicle.

Upon the shaft B within the frame A are mounted the sprocket-wheel G and the spur-wheel H.

Upon the shaft C is loosely mounted the spur-wheel I, arranged to engage the spur-wheel H upon the shaft B, and upon the said shaft C, opposite the sprocket-wheel G, is loosely mounted the sprocket-wheel J, which is arranged to communicate motion to the sprocket-wheel G through the chain K. The sprocket-wheel J and the spur-wheel I are each provided with clutch-teeth $a$, and upon the shaft C, between the sprocket-wheel J and spur-wheel I, is mounted a clutch $b$, having teeth $a'$ on opposite sides thereof for engaging the teeth $a$ of the wheel J or of the wheel I. The clutch $b$ is grooved circumferentially to receive the forked clutch-lever $c$, which extends above the top of the frame A, and is pivoted in a cross-bar $d$ extending across the frame.

Upon the shaft C, outside of the sprocket-wheel J, is secured a fly-wheel L, and between the fly-wheel and the side of the frame A and upon the same shaft C is secured a pinion $e$, which is engaged by a spur-wheel $f$, mounted on the shaft D, and upon the said shaft D is secured a spur-pinion $g$, which is engaged by a spur-wheel $h$ on the shaft E, the said pinion $g$ having sufficient width of face to allow the spur-wheel $h$ to move laterally without becoming disengaged from the pinion. The shaft E is screw-threaded near its ends and turns in nuts formed in the side pieces of the frame A, so that as the said shaft E revolves it will travel longitudinally in one direction or the other, according to the direction of the rotation of the shaft, and the plain end portions of the shaft at the ends of the screw-thread will permit the shaft to run without breakage should the attendant neglect to shift the clutch and stop the mechanism when the springs are compressed.

In the sides of the frame A are inserted studs $h'$, which support cross-bars $i'$, between which and the sides of the frame are placed the spiral springs $j'$, the said spiral springs being attached to both the cross-bars and the frame, so as to cause them to press against the ends of the shaft E.

Upon the shaft E are mounted two pinions $l\,l'$, and below the said pinions are arranged cylinders $m\,m'$, containing springs M M'. To the upper ends of the springs M M' are secured rack-bars $n\,n'$, which are adapted to engage the pinions $l\ l'$. Upon the shaft E are loosely placed the angled bars $o\ o'$, between collars upon the said shaft, so that the said bars will be carried along by the shaft, while they are prevented from turning by the entrance of their lower angled ends into ears $p\ p'$, formed at the upper ends of the cylinders $m\ m'$. The upper ends of the bars $o\ o'$, which are bent at a right angle parallel with the shaft, have curved extremities to facilitate their engagement with the grooved rollers $q\ q'$ in the ends of the rack-bars $n\ n'$, in a manner presently to be described.

To a standard N, projecting upward from the frame A, is pivoted a brake-lever O, provided with a clutch P, adapted to engage the rim of the fly-wheel L, and pivotally connected by a rod Q with the brake-lever R, pivoted in the frame A and adapted to engage another side of the fly-wheel L.

To the brake-lever O is attached an arm $r$, which is adapted to be engaged by a pin $s$, projecting from the side of the clutch-lever $c$. When the clutch $b$ is being shifted from the teeth of the spur-wheel I to the teeth of the sprocket-wheel J or in the reverse direction, the brake mechanism holds the fly-wheel L and prevents the running down of the spring M or M'. When the vehicle is descending a downgrade, the clutch $b$ is drawn into engagement with the teeth of the sprocket-wheel J or the spur-wheel I, according to whether the vehicle is going forward or backward, and motion is communicated to the rack-bar $n$ or $n'$ through the intermediate mechanism, and the spring M or M' is compressed.

In the regular operation of the device the pinion $l'$ first engages the rack-bar $n'$ and pushes it downward, thereby compressing the spring M', and as the shaft E continues to revolve the screw-thread formed thereon will carry the pinion $l'$ out of engagement with the rack-bar $n'$; but just before the pinion leaves the said rack-bar the upper part of the angled bar $o'$ will engage the grooved roller $q'$ and thus hold the spring M' under compression, at the same time the pinion $l$ will be brought into engagement with the rack-bar $n$, and the rotation of the said pinion will cause the rack-bar to descend, thereby compressing the spring M. This operation will continue until the grooved roller $q$ passes below the upper part of the bar $o$, when the said bar will be carried over the grooved roller, thereby holding the said rack-bar $n$ so as to retain the spring M under compression.

When it is desired to utilize the power stored in the manner described, the clutch $b$ is brought into engagement with the clutch-teeth $a$ of the wheel I, and the fly-wheel L being released by the same movement power is communicated to the shaft B from one or the other of the springs M M' through the train of gearing, and the wheels I H will thus be made to assist in propelling the vehicle forward. The first rotation of the shaft E causes the disengagement of the grooved roller $q$ from the bar $o$ at the moment when the pinion $l$ engages the rack-bar $n$, so that the spring is free to act through the rack-bar upon the pinion and thus transmit its power to the shaft of the vehicle. When the second rack-bar is reached, the same operation is repeated.

The fly-wheel A' (shown in Fig. 4) is designed to relieve the mechanism of the shock of stopping and starting. The said wheel A' is provided with a rim $a^2$, which is formed integrally with the spokes $b^2$, the said spokes being provided with a hub fitted loosely to the axle B', and upon the said axle is secured a hub carrying the spokes $c^2$, which are arranged to loosely embrace the rim $a^2$ of the wheel.

Between the spokes $b^2$ and $c^2$ are placed spiral springs $d^2$, through which motion is transmitted from the spokes $c^2$ to the spokes $b^2$ and the rim $a^2$. Any sudden shock or jar upon the axle B' and spokes $c^2$ will be modified by the springs $d^2$, so that the breaking of the wheel and parts connected therewith will be avoided.

Having thus described my invention, I claim as new and desire to secure by Letters Patent—

1. In a starter for vehicles, the combination of a shaft having longitudinal movement, a pinion on the shaft, the spring, a rack for compressing the spring engaging the pinion, and means for operating the shaft, substantially as described.

2. The combination of the shaft B, provided with the sprocket-wheel G and spur-wheel H, the shaft C, the spur-wheel I, provided with clutch-teeth $a$, the sprocket-wheel J, provided with clutch-teeth $a$ and mounted loosely upon the shaft C, the chain K, the clutch $b$, adapted to engage the teeth of the sprocket-wheel or spur-wheel, and a spring arranged to be compressed by power transmitted through the sprocket-wheels and chain K, and capable of giving out its power through the shaft C and spur-wheels I H, substantially as specified.

3. The combination, with the fly-wheel L of the power-storing mechanism, of the brake adapted to hold the said fly-wheel, substantially as specified.

4. In a starter for vehicles, the combination of a shaft having a longitudinal movement, a pinion on the shaft, a spring, a rack for compressing the spring engaging the pinion, and means for operating the shaft and locking the rack depressed when disengaged from the pinion, substantially as herein shown and described.

5. In a starter for vehicles, the combination, with a train of gearing driven from the axle of the vehicle, of a shaft having an endwise movement and rotated from the train of gearing, pinions on the shaft, racks alternately engaging the pinions, springs under the racks, and locking-arms on the said shaft and engaging the upper ends of the racks when depressed, substantially as herein shown and described.

6. In a brake and starter for vehicles, the combination of the screw-threaded shaft E, the pinions $l\ l'$, rack-bars $n\ n'$, the springs M M', and the angled bars $o\ o'$, carried by the shaft E, substantially as specified.

7. In a brake and starter for vehicles, a drive-wheel formed of the rim $a^2$ and spokes $b^2$, cast integrally and mounted upon a hub, and the spokes $c^2$, formed on a separate hub and embracing the rim $a^2$ loosely, and springs $d^2$, interposed between the spokes $b^2\ c^2$, substantially as specified.

JOHN H. BOOM.

Witnesses:
J. C. READ,
W. WALLER.